United States Patent [19]

Sawada et al.

[11] 4,307,602
[45] Dec. 29, 1981

[54] KNOCK SENSOR

[75] Inventors: Daisaku Sawada, Susono; Juhei Takahashi, Yokohama; Tadayori Makino, Tokyo; Kenzo Miura, Yokohama, all of Japan

[73] Assignees: Matsushita Electric Industrial Co., Ltd., Osaka; Toyota Jidosha Kogyo Kabushiki Kaisha, Toyota, both of Japan

[21] Appl. No.: 106,881

[22] Filed: Dec. 27, 1979

[30] Foreign Application Priority Data

Dec. 29, 1978 [JP] Japan ................. 53-165745
Dec. 29, 1978 [JP] Japan ............. 53-183245[U]
Dec. 29, 1978 [JP] Japan ............. 53-183246[U]

[51] Int. Cl.³ ............................................ G01L 23/22
[52] U.S. Cl. .................................. 73/35; 310/332
[58] Field of Search ............ 73/35, 517 AV; 310/330, 310/331, 338, 332

[56] References Cited

U.S. PATENT DOCUMENTS

| | | | |
|---|---|---|---|
| 3,497,731 | 2/1970 | Straube | 310/331 X |
| 4,091,679 | 5/1978 | Furusawa et al. | 73/517 AV X |
| 4,153,020 | 5/1979 | King et al. | 73/35 X |
| 4,233,836 | 11/1980 | Yoneda et al. | 73/35 |

FOREIGN PATENT DOCUMENTS 2801969 7/1979 Fed. Rep. of Germany .......... 73/35

Primary Examiner—Jerry W. Myracle
Attorney, Agent, or Firm—Stevens, Davis, Miller & Mosher

[57] ABSTRACT

A piezoelectric ceramic vibrator is mounted inside a metal case including a portion adapted for fastening the case to an engine, and the vibrator is adapted to resonate in response to a vibration frequency produced upon knocking of the engine. The output of the vibrator is taken out as a knock output.

4 Claims, 19 Drawing Figures

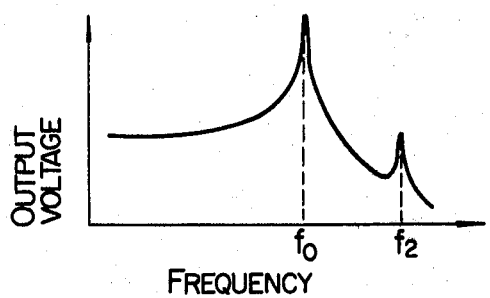
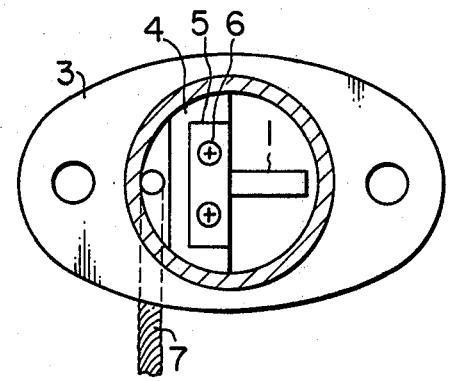
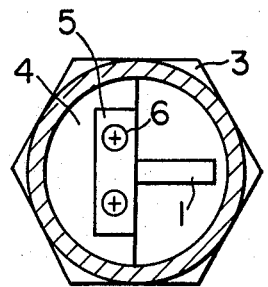
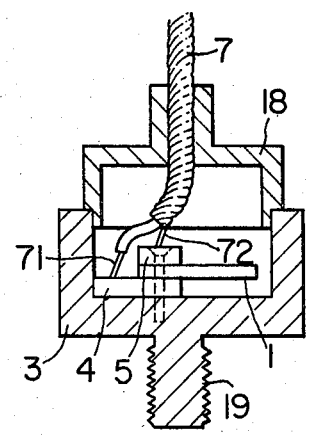
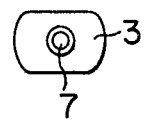

KNOCK SENSOR

BACKGROUND OF THE INVENTION

This invention relates to a knock sensor for accurately detecting knocking of an engine for automotive vehicles or the like.

The occurrence of engine knock in an automobile is an important factor which is detrimental to the smooth running of the automobile, the durability of the engine and the improvement of the fuel consumption. Such knocking can be eliminated by controlling the ignition timing, the air-fuel mixture ratio or the like.

FIGS. 1a and 1b show the vibration waveforms of a vehicle engine detected by a vibration pickup having a flat frequency characteristic. While a high-level waveform A appears periodically in response to each ignition in both the normal operating condition of FIG. 1a and the knocking condition of FIG. 1b, in the knocking condition another high-level waveform B appears at a time different from the time of each ignition in addition to the periodic waveforms A.

FIGS. 2a and 2b show the spectra of the waveforms shown in FIGS. 1a and 1b. FIG. 2a corresponds to the normal operating condition and FIG. 2b corresponds to the knocking condition. As will be seen from FIGS. 2a and 2b, in the normal operating condition the spectrum has no marked characteristic feature, although there are some irregularities. In the knocking condition, however, the spectrum shows some characteristic high peaks at 7 to 8 kHz. Such peak varies depending on the type and size of engines and it is present at 6 to 9 kHz. As a result, the knocking condition can be detected from the level of the peak in this band. On the other hand, the S/N ratio of a signal detected in the vicinity of a vehicle engine is extremely inferior electrically. Consequently, if the vibration waveform is simply picked up by a vibration pickup having a flat frequency characteristic, it will be impossible to efficiently detect a frequency which is characteristic of the knocking.

SUMMARY OF THE INVENTION

This invention has stemmed up from the recognition of the above-mentioned fact. In other words, several types of vibration pickups are known including (1) the moving coil type, (2) the moving magnet type, (3) the piezoelectric ceramic type, etc., and the piezoelectric ceramic type is preferred most in consideration of its high resonant frequency, high quality factor and high mechanical strength. The piezoelectric ceramic type is also advantageous from the standpoint of sensitivity in that while the piezoelectric ceramic type shows a flat frequency characteristic with respect to a certain acceleration, the moving coil type and the moving magnet type will be degraded in sensitivity at 6 dB/oct.

It is therefore an object of the invention to provide a knock sensor comprising a vibration pickup employing a piezoelectric ceramic having a resonant frequency in the range of 6 to 9 kHz and a high quality factor so as to detect knocking of an engine with an improved S/N ratio.

It is another object of the invention to provide such knock sensor which can be easily mounted to an engine.

BRIEF DESCRIPTION OF THE DRAWINGS

FIG. 8 is a band-pass characteristic diagram for another embodiment of the invention.

FIG. 9 is a top view showing still another embodiment of the invention.

FIGS. 10a and 10b are respectively a top view and side sectional view of still another embodiment of the invention.

FIG. 11 is a top view showing still another embodiment of the invention.

DESCRIPTION OF THE PREFERRED EMBODIMENTS

Figure 3A:
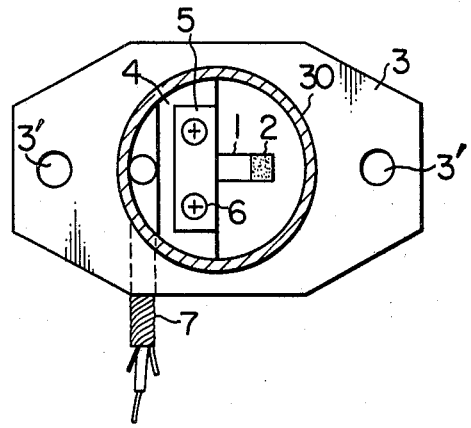
FIGS. 3a and 3b are respectively a top view and side sectional view of a knock sensor in accordance with an embodiment of the invention.
Figure 3B:
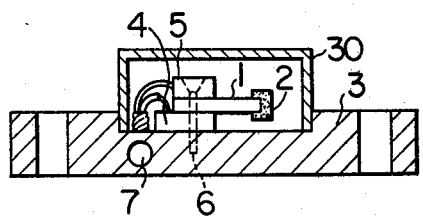

Referring to FIGS. 3a and 3b, numeral 1 designates a piezoelectric ceramic type vibrator, 2 a metal piece fitted on the tip of the vibrator 1 with an insulating adhesive so as to serve as an additional mass, 3 an elliptic metal case, 3' holes into which are inserted screws adapted to be fitted in a part of an engine, 4 a base made of a glass epoxy type material, 5 a metal plate, 6 fastening screws, 7 a sealed wire, and 30 a cap. In this case, the ground wire of the sealed wire 7 is soldered to the metal plate 5 and the metal plate 5 conducts current to the metal case 3 by means of the screw 6, thus providing the ground case.

Figure 4A:
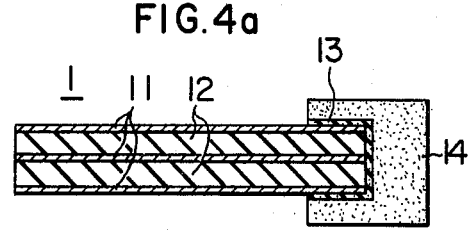
FIGS. 4a, 4b and 4c are side views showing the principal parts of the knock sensor shown in FIGS. 3a and 3b.
Figure 4B:
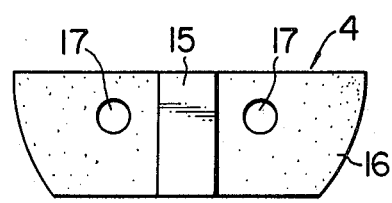
Figure 4C:
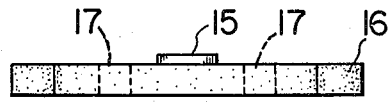

FIGS. 4a, 4b and 4c show in detail the construction of the vibrator 1 and the base 4. In FIG. 4a showing the vibrator 1, numeral 11 designates metal foils, 12 a ceramic, 13 an insulating adhesive which may suitably be of the quick drying type, and 14 a metal piece serving as an additional mass. In this case, the ceramic 12 is arranged in two layers between the metal foils 11 arranged in three layers so as to shape the piezoelectric ceramic into a so-called bimorph cell form and this construction ensures an improved sensitivity and S/N ratio. The metal piece 14 is an additional mass and it must be more than several times the mass of the piezoelectric ceramic (only the moving portion). Otherwise, as will be seen from FIG. 8, the second harmonic approaches to the resonant frequency $f_o$ and the detection of knock will be made impossible.

As a result, the additional mass 14 must be made of a metallic material which is as heavy as possible with the minimum possible size and which is large in specific weight. To prevent conduction between the metal foils 11, the adhesive 13 should serve the dual purposes of insulation and fixing and a suitable material will be cyanol adhesive, for example.

In FIGS. 4b and 4c respectively showing a top view and front view of the base 4, numeral 15 designates a copper foil, 16 a glass-filled epoxy and 17 holes into which are inserted the screws 6 shown in FIGS. 3a and 3b. The base 4 serves the dual purposes of providing electrical insulation and taking out a signal and it must have a considerable hardness so as to pick up vibrations up to 10 kHz. As a result, a base made of glass epoxy type material is suitable, although a base of any other material may of course be used if it has a sufficient hardness. The vibrator 1 formed as shown in FIG. 4a is placed in part on a portion of the copper foil 15 and the signal wire of the sealed wire 7 is soldered to a portion of the remainder of the copper foil 15.

Figure 5:
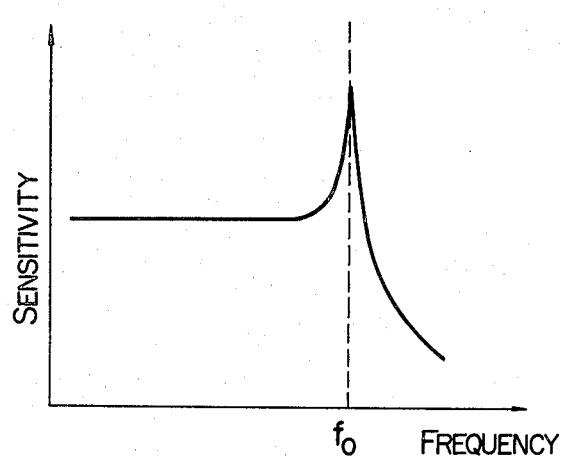
FIG. 5 is a band-pass characteristic diagram for the knock sensor.

The sensor shown in FIGS. 3a, 3b and 4a to 4c has a frequency characteristic such as is shown in FIG. 5. The fact that the characteristic is flat at the frequencies lower than the resonant frequency $f_o$ is due to the vibration system being subjected to the stiffness control.

Figure 6A:
FIGS. 6a and 6b are diagrams showing the detected engine vibration waveforms.
Figure 6B:

FIGS. 6a and 6b show the engine vibration waveforms picked up by the sensor having the frequency characteristic shown in FIG. 5. FIG. 6a shows the vibration waveform detected in the normal operating condition and FIG. 6b shows one detected in the engine knocking condition.

Figure 1A:
FIGS. 1a and 1b are diagrams showing engine vibration waveforms.
Figure 1B:
Figure 2A:
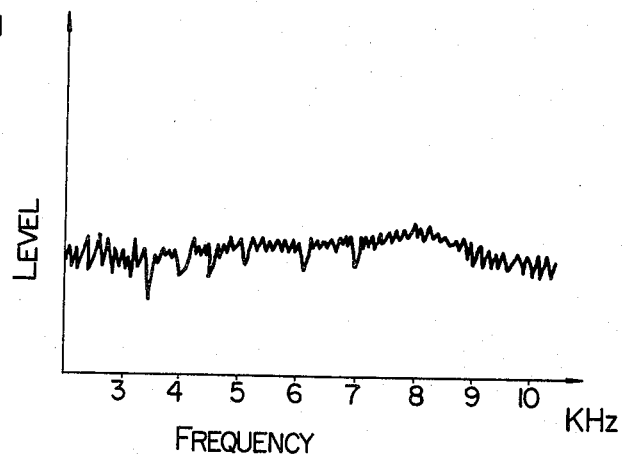
FIGS. 2a and 2b are spectral diagrams for the vibration diagrams of FIGS. 1a and 1b.
Figure 2B:
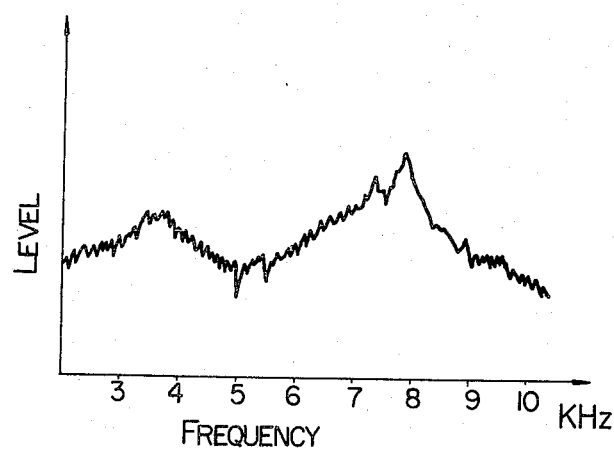
Figure 7A:
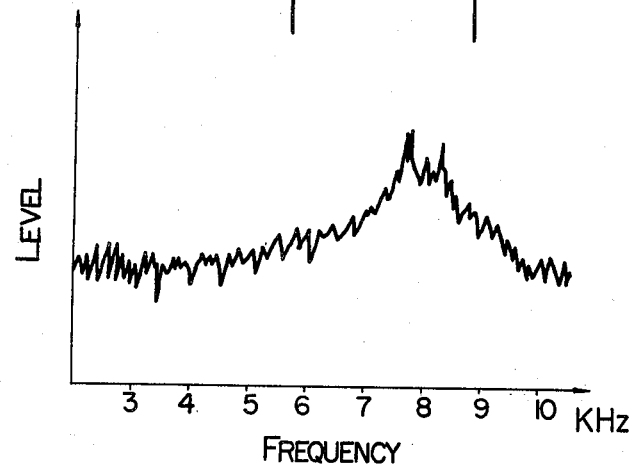
FIGS. 7a and 7b are spectral diagrams for the vibration diagrams of FIGS. 6a and 6b.
Figure 7B:
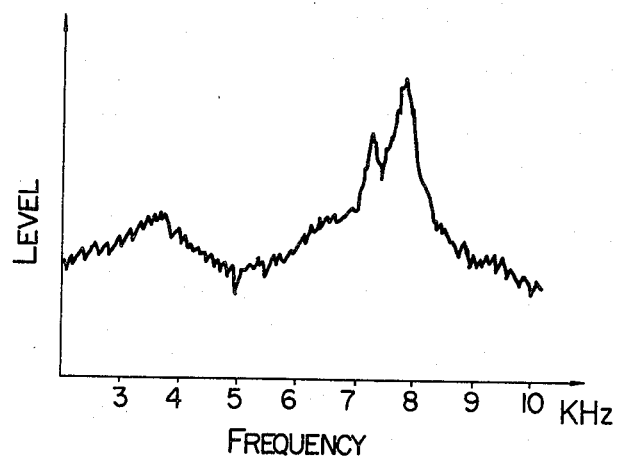

FIGS. 7a and 7b show the spectra of the engine vibration waveforms shown in FIGS. 6a and 6b, with FIG. 7a showing the spectrum for the normal operating condition and FIG. 7b showing the spectrum for the knocking condition. Thus, as will be seen from a comparison between FIGS. 7b and 2b, the levels at 6 to 9 kHz are considerably high as compared with the other bands. In other words, the S/N ratio is improved.

The resonant frequency of the sensor is determined by the length, Young's modulus, density and thickness of the vibrator forming a cantilever and the additional mass 14. Usually, the resonant frequency is adjusted by means of the length of the vibrator 1 and the additional mass 14.

On the other hand, the second resonant frequency $f_2$ shown in FIG. 8 should preferably be higher than the resonant frequency $f_o$. The reason is that only the detection of the frequencies around the resonant frequency $f_o$ is desired. The second resonant frequency $f_2$ is determined by the same factors as the resonant frequency $f_o$. In addition, once the resonant frequency $f_o$ is established, the second resonant frequency $f_2$ can be determined linearly by an additional mass $M_2$ and the second resonant frequency $f_2$ will become closer to the resonant frequency $f_o$ with decrease in the additional mass $M_2$.

However, where the additional mass $M_2$ is reduced to zero, that is, where the additional mass $M_2$ is eliminated, if the resonant frequency is selected 8 kHz, the resulting second resonant frequency $f_2$ will become about 56 kHz. With the resonant frequency of about 56 kHz, usually the quality factor Q is considerably high and the amplitude and duration time of the engine vibration are respectively very small and short. As a result, such resonant frequency will not be practically detected and the detection of a vibration waveform of 8 kHz will not be affected in any way.

FIG. 9 shows the construction of another embodiment of the invention which includes no additional mass $M_2$. While, in the previously described sensor, the resonant frequency $f_o$ and the quality factor Q are mutually related and they cannot be adjusted independently of each other, if, for example, a piezoelectric ceramic (1.5 mm wide and 0.6 mm thick) is employed, the resonant frequency can be adjusted as desired within the range of 6 to 9 kHz in dependence on the length from the clamped portion to the tip of the piezoelectric ceramic and the quality factor can also be determined linearly. Of course, any peculiar resonant frequency can be obtained with a reduced deviation by using a jig.

In this way, by means of a simple construction and a simple adjustment, it is possible to provide a sensor having the frequency characteristic shown in FIG. 5 with the resonant frequency of 6 to 9 kHz and the quality factor of 10 to 100 and knocking of a vehicle engine can be detected with an improved S/N ratio. While the resonant frequency is selected within the range of 6 to 9 kHz, in the case of engines the peak may be detected at a frequency in the range of 11 to 15 kHz and consequently the resonant frequency may be selected to come within the range of 6 to 9 kHz or 11 to 15 kHz or the overall range of 6 to 16 kHz.

On the other hand, the knock sensor of the construction described above must be firmly fastened to the aluminum die casting or iron casting forming the body of a vehicle engine. In other words, higher the frequency, the effects of the secondary resonances of the sensor parts and the loss will be increased tending to cause a deterioration of the sensitivity-frequency characteristic (in particular the secondary resonances) shown in FIG. 5.

However, when the aluminum die casting or iron casting including the engine body is considered as a knock sensor mounting surface, it is nearly impossible to find in its surface a plane portion having a fairly accurate flatness and extending over 40 mm in diameter and the contact area between the knock sensor and the engine body will in effect be decreased. Thus there is the disadvantage of tending to cause complicate resonances and losses with the engine vibrations.

FIG. 10 shows still another embodiment of the invention which is designed to overcome the foregoing deficiency. In this embodiment, a case 3 is formed into a hexagonal shape and provided inside the case 3 are a vibrator 1, a base 4, a metal plate 5 and screws 6 for fastening the metal plate 5, the vibrator 1 and the base 4 to the case 3. In this case, a sealed wire 7 has its signal wire 71 connected to a conductor below the vibrator 1 and its ground wire 72 connected to a conductor above the vibrator 1 through the metal plate 5. Numeral 18 designates a cap including a cord clip, and 19 a threaded portion for mounting the sensor to an engine.

By virtue of this construction, the knock sensor is shaped long in the vertical direction and consequently by forming the engine body with the required thread of about M8 (diameter 8 mm) size (the threads cuts in the engine body are mostly of the M8 size) and ensuring around the threaded portion a place surface of about 20 mm in diameter, it is possible to positively secure the knock sensor to the engine body. The fact that the metal case 3 has a hexagonal shape, has the effect of making the fastening and fixing of the sensor easy and also ensuring a precise mounting of the sensor.

The case 3 is not intended to be limited to the hexagonal columnar shape and it may be shaped as shown in FIG. 11. It is only necessary that the case 3 is formed into any shape which makes the use of a wrench or box driver possible.

We claim:

1. A knock sensor for detecting vibrations of an engine comprising:
   a metal case having a recess and an attachment means for fixing said metal case to a body portion of said engine,
   a ceramic vibrator mounted inside of said recess, said ceramic vibrator having one end fixed to said metal case by means of a fixing metal plate sandwiching said one end against a surface of said recess, a base plate of electrically insulating material having an electrically conductive layer formed on one surface thereof, said base plate being interposed between said one end of said ceramic vibrator and the surface of the recess of said metal case so that said electrically conductive layer is in contact with said ceramic vibrator, a cable for providing an output signal from said ceramic vibrator, one conductor of said cable having one end electrically connected to one of said fixing metal plate and said metal case, the other conductor of said cable having one end electrically connected to said electrically conductive layer, and a cover covering the recess of said metal case enclosing said ceramic vibrator.

2. A knock sensor as set forth in claim 1, wherein said ceramic vibrator is in the form of a cantilever.

3. A knock sensor as set forth in claim 1, wherein said ceramic vibrator is composed of two ceramic pieces placed one upon another.

4. A knock sensor as set forth in claim 1, wherein said metal case is formed in a hexagonal shape, and said attachment means is a threaded projection extending outwardly from the bottom of said metal case.

* * * * *